July 15, 1941.                J. R. ROYER                2,249,046
                              FARM GATE
                           Filed July 3, 1939
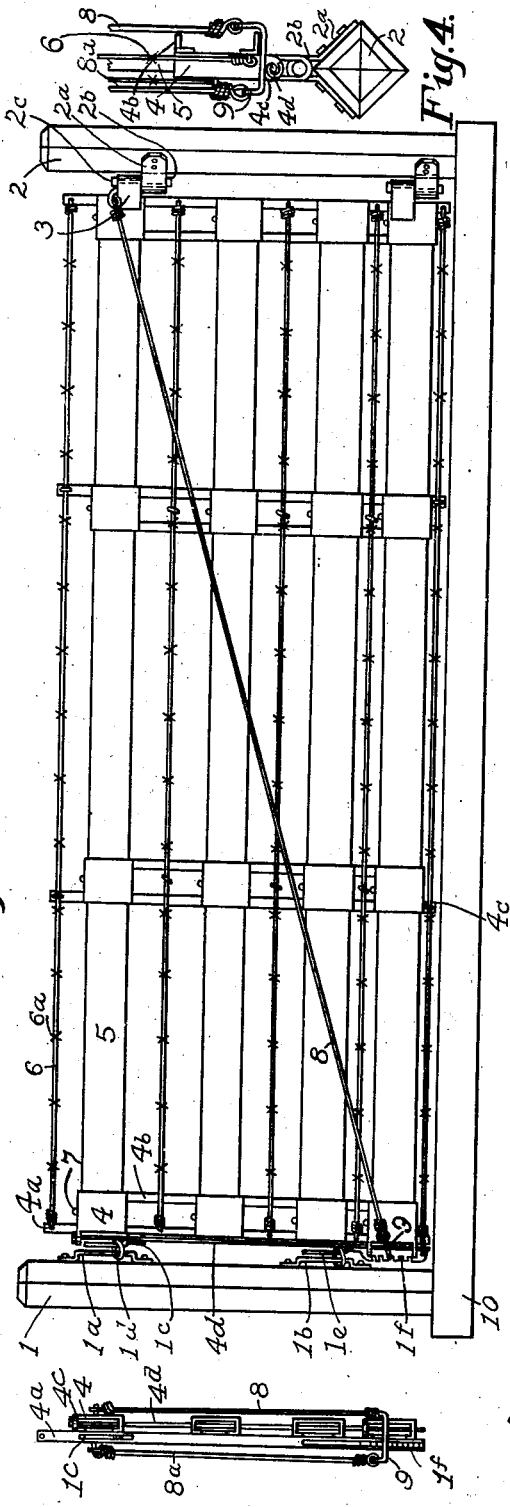
Inventor,
Jesse R. Royer, by
Attorney.

Patented July 15, 1941

2,249,046

UNITED STATES PATENT OFFICE 2,249,046

FARM GATE

Jesse R. Royer, Janesville, Iowa

Application July 3, 1939, Serial No. 282,697

1 Claim. (Cl. 256—73)

My invention relates to improvements in farm gates, and one object of my improvements is to furnish a gate of this type which may be easily assembled or disassembled when desired.

Another object of my improvements is to associate with a plurality of wooden horizontal spaced beams, metallic vertically disposed spaced and apertured cross connections adapted to be connected together crosswise of said beams and also spaced connections tensioning with tensioning rods for bracing them stiffly together longitudinally and also obliquely for stiffening the general structure.

Another object of my improvements is to shape the vertical cross connections with sockets therealong for seating the longitudinal wooden bars therein, and provided with end devices for retaining the longitudinal bars in their seats when assembled, with locking means for holding them together, releasably.

I have accomplished the above objects by the means and constructions which are hereinafter described, claimed and illustrated by the accompanying drawing, in which Fig. 1 is a side elevation of the gate and its supporting means as assembled. Fig. 2 is a top plan of the same, and Fig. 3 is an end elevation of the outer part of the gate without the end posts therefor. Fig. 4 is an enlarged fractional plan view of the swing end part of the gate and its associated post with releasable connection. Figs. 5 and 6 are enlarged representations of opposite end parts of the gate with portions broken away and with Fig. 5 in perspective, while Fig. 6 is in side elevation.

Referring to said Fig. 1, 10 is a beam or support to whose opposite ends the vertical like fence posts 1 and 2 are rigidly connected, but when desired, the posts may be embedded in the ground at opposite sides of a passageway or the like and as terminals of fences.

Between these posts a gate is swingingly hung at one end on the post 2. As shown in Figs. 1, 2 and 4, vertically spaced horizontal looped bearings 2b have their end parts bent outwardly angularly at 2a to be secured to the post 2 by screws or other means. Headed pintles 2c traverse these bearings and also like looped hinging parts 3 supported thereon rockingly and which are fixed upon the hither parts of the gate by means to be hereinafter described.

The gate shown, while being demountable from said posts, is assembled from spaced longitudinal horizontal planks 5 of wood or other suitable material arranged one above another as shown in Fig. 1, and connected together by rigid vertical end members, 4, 4a and 4b in each, with other like members spaced apart between them, and said members are removably connected to and seat said planks 5 thereon disassemblably, and with releasable locking means, to be described, between them to maintain the planks in position and prevented from displacements from said connecting members endwise.

As stated, each of the vertical members are made up of sections rigidly connected together. Each such member contains a pair of spaced vertical angle-bars 4a and 4b, of like shapes and with their concave faces facing each other as shown in Fig. 2 endwise, in plan. Said angle-bars are spaced apart longitudinally and are welded, as shown in Figs. 3 and 4, across the C-shaped members 4 vertically and spanning the intervals between the members 4. Each terminal angle-bar 4a projects above the uppermost casing member 4, as also below the lowermost casing member below at both ends of the gate, while the intermediate angle-bars, spaced apart from the others, also extend above and below the apposed members 4, as at 4c, and barbed wires 6 with barbs 6a are connected tensionally across the said angle-bar terminations and secured thereto by staples or looped ends traversing apertures in the said extended-end angle-bars. There is shown in Fig. 5, an enlarged perspective view of means for stopping one end, or both if desired, of the outermost members 4 to prevent displacements of the planks or longitudinal bars 5 therefrom endwise. This means consists of upper and lower end projections 4c extending longitudinally outwardly from said terminal members 4 and apertured in line vertically to seat therethrough the headed pin or pins 4d at a location in each instance contacting the abutting end of each bar 5, or at any rate preventing escape of such bars endwise. Thus the gate parts are rigidly assembled. However, additional like longitudinally sloping reach rods 8 and 8a are at their rear ends connected to the rear upper members 4, and have at their lower forward ends loops 9 engaging adjustably any of the notches in a bar part 1f on the lowermost forward member 4 to tension said structures.

As shown in Figs. 1, 2 and 4, upper and lower looped bearings 3 fixed on the upper and lower members 4 at the rear of the gate are traversed by headed pintles 2c, which also traverse similar looped bearings 2b with end parts secured fixedly on the rear post 2 immediately below and supporting swingingly the upper bearings 3 and the gate. The pintles 2c may be removed to permit the elements 4 and 5 to be disassembled, after removal of the barbed wires 6, and the tension members 8 and 8a.

Referring to Fig. 1, means are shown for securing releasably the fly end of the gate to the other post 1. This consists of spaced longitudinal loops 1a, 1b fixed on the post 1 opposite to the hither end of the gate, and upwardly directed fingers 1c, 1e secured fixedly on the upper and lower faces of the adjacent members 4a, and rings 1d loosely seated on the loops 1a an 1b, and adapted to be slipped over the fingers 1c and 1e, releasably.

As shown in Fig. 2, the tension rods 8 and 8a may be engaged with the opposite ends of the gate by similar looped members 9 and 9a, if desired.

As shown in said Fig. 6, alternative means are shown for stopping the outer end openings of one or both ends of the boxing members 4 to inclose and hold within said members the bar ends 5 from looseness or endwise shifting or escape therefrom. This consists in having an integral end wall 4e abutting the outer end of the incased plank or bar 5. As shown in Figs. 5 and 6, both means may be employed if desired.

The gate is therefore demountable and disassemblable for storage or transportation, yet when assembled is fully connected in its parts and braced against subsidence when mounted.

As shown in Fig. 1, headed brads 7 may be driven through holes in the members 4 into the wood bars incased within, to releasably secure them on the bars against longitudinal displacements.

I claim:

In a farm gate, in combination, spaced forward and rear fixed posts, the gate having a plurality of like metal standards including vertically spaced C-shaped boxes opening at one side of the gate and rigidly connected by spaced vertical arms, the rear standard boxes being closed rearwardly, wooden horizontal beams removably seated through said boxes, vertically spaced hinged connections between the rear post and the rear cross walls of certain of said boxes, separable linking connections between the forward post and certain parts of the forward standard, a vertical rearwardly dentated member fixed on the lower forward part of the forward standard, strain rods positioned alongside the opposite faces of the gate, connected at their rear ends to the uppermost part of the rear standard, inclined forwardly downwardly with their forward ends connected by a transverse clevis adapted to adjustably seat between detents of the dentated member, the forward end parts of the upper and lower boxes of the forward standards being apertured in alinement, and a headed pin traversing the apertures of said end parts removably to close the forward open ends of the forward standards.

JESSE R. ROYER.